(12) United States Patent  
Denny (10) Patent No.: US 8,330,308 B2
(45) Date of Patent: Dec. 11, 2012

(54) MOTOR ASSEMBLY

(75) Inventor: Mark Joseph Denny, Wareham (GB)

(73) Assignee: BP Exploration Operating Company Limited, Middlesex (GB)

( * ) Notice: Subject to any disclaimer, the term of this patent is extended or adjusted under 35 U.S.C. 154(b) by 205 days.

(21) Appl. No.: 12/737,103

(22) PCT Filed: Jun. 9, 2009

(86) PCT No.: PCT/GB2009/001430
§ 371 (c)(1),
(2), (4) Date: Dec. 8, 2010

(87) PCT Pub. No.: WO2009/150407
PCT Pub. Date: Dec. 17, 2009

(65) Prior Publication Data
US 2011/0089778 A1    Apr. 21, 2011

(30) Foreign Application Priority Data

Jun. 13, 2008 (EP) ..................................... 08252037

(51) Int. Cl.
*H02K 11/00* (2006.01)

(52) U.S. Cl. .............................. 310/71; 310/87; 310/179

(58) Field of Classification Search .................... 310/71, 310/87, 179–180, 184, 197–198
See application file for complete search history.

(56) References Cited

U.S. PATENT DOCUMENTS

| 2,261,477 | A  |   | 11/1941 | Kuner |   |
|---|---|---|---|---|---|
| 3,742,595 | A | * | 7/1973 | Lykes | 29/596 |
| 4,546,300 | A | * | 10/1985 | Shaikh | 318/786 |
| 4,583,923 | A | * | 4/1986 | James | 417/414 |
| 7,378,769 | B2 | * | 5/2008 | Head | 310/87 |
| 7,504,752 | B2 | * | 3/2009 | Head | 310/87 |
| 2007/0273225 | A1 | * | 11/2007 | Head | 310/87 |
| 2008/0111434 | A1 | * | 5/2008 | Head | 310/87 |

FOREIGN PATENT DOCUMENTS

| FR | 2 678 987 A | 1/1993 |
|---|---|---|
| WO | WO 01/39353 A1 | 5/2001 |

* cited by examiner

*Primary Examiner* — Thanh Lam
(74) *Attorney, Agent, or Firm* — Nixon & Vanderhye (57) ABSTRACT

A motor assembly comprising a motor unit having a first end and a second end and being couplable adjacent the first end of the motor unit to an external electrical device, the motor unit comprising at least one motor winding extending between the first and second ends and an electrical return path extending from the second end to the first end, the electrical return path being in electrical contact at the first end with an electrical connector for supplying impressed secondary power to the external electrical device, wherein the first end of the motor unit is provided with means for coupling a power source to the motor winding and the second end of the motor unit is provided with means to electrically couple the motor winding to the electrical return path. Also provided is a motor comprising a motor winding having a first end and a second end and an incomplete number of winding turns between the first and second ends, and an electrical return path for passing a current through the motor, the motor winding and the electrical return path being discontinuous.

13 Claims, 5 Drawing Sheets

MOTOR ASSEMBLY

This application is the U.S. national phase of International Application No. PCT/GB2009/001430 filed 9 Jun. 2009 which designated the U.S. and claims priority to European Application No. 08252037.0 filed 13 Jun. 2008, the entire contents of each of which are hereby incorporated by reference.

This invention relates to the winding arrangement of a motor assembly, particularly for submersible motors which are deployed into subterranean wells and which use the motor's power cable to supply power to a separate electrical device located in the well. The invention also relates to a motor which can be used to form part of a larger motor assembly.

Motors are used extensively in a wide variety of industries. In the petroleum industry, motors are sometimes used with electric submersible pumps (ESPs) to artificially lift fluids from well bores where the well bore pressure is insufficient to lift the fluids to the surface without assistance. Without such assistance, the production rate of a well will fall and ultimately the well will die.

Existing ESPs are conventionally run into a well on a jointed tubing string, with the motor used to power the pump being attached below the pump. A power cable is secured to the tubing string with clamps to supply electric power to the motor. The motors used are typically 3 phase induction motors, the three phase windings being electrically connected together at a "star point" at the bottom of the motor. The three phases can be connected together at the star point because they are balanced at that point.

It is known to connect two or more small motors together in series to create a longer, more powerful motor. To facilitate this, the star point can be fashioned as a separate component that is connected to the winding of the lowermost motor.

Normally, each phase winding of a motor consists of a number of "turns", a single "turn" being a loop or coil from one end of the winding, around an end turn, and returning back to the same point. It can be seen that for a symmetrical motor winding, the 3 phase windings are connected together to form the star point at the same end of the motor as the power cable connection.

In motors used to power ESPs, the power cable is connected to the winding at the top of the motor at a pothead, but to enable the series connection of motors, the last turn of the winding is necessarily not a full turn, but is instead a half turn. In other words, the winding starts at the top of the motor and ends at the bottom of the motor. It is therefore possible to provide a plug and socket arrangement at each end of all but the uppermost motor (where the top is the pothead or cable connection) allowing a number of small motors to be connected in series creating a large motor. As there are 3 discrete windings in each motor, one for each phase, there are three pins at each plug and socket connection.

A copper ring plugged into the socket of the lowermost motor connects all three windings together electrically forming the star point.

Figure 1:
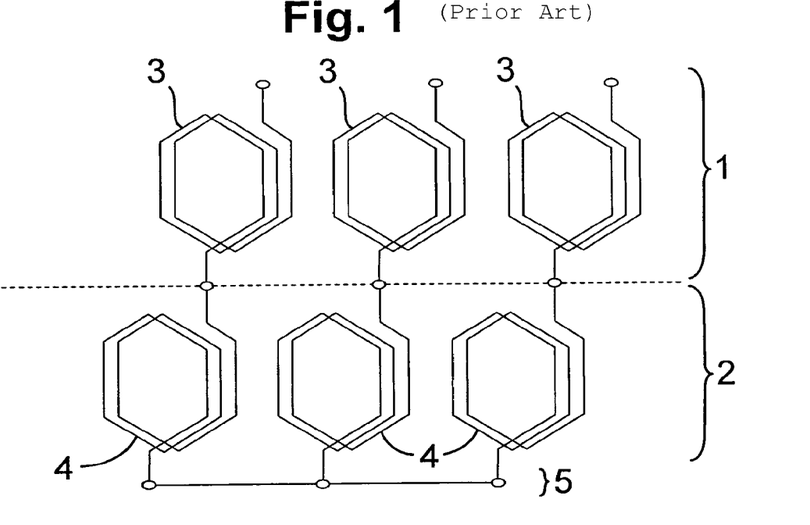
FIG. 1 is a schematic diagram of the windings of a conventional motor assembly.

An example of a conventional motor assembly comprising two motors (1,2) coupled together is shown in FIG. 1. It can be seen that, in this illustration, the phase windings comprise 2.5 turns each. In practise, many more turns would be used. Each phase winding (3) of the first motor (1) is coupled to a phase winding (4) of the second motor (2) so that the phase windings (3,4) are connected in series. The ends of the windings of the second motor are connected as a star point (5) at the bottom of the motor assembly. The power cable is connected to the windings of the first motor by way of a pot head (not shown).

When using ungrounded three phase AC induction or permanent magnet motors, it is possible to superimpose a secondary voltage onto the three phase AC supply without affecting the operation of the motor or surface electrical system. The secondary voltage is effectively invisible to the motor circuit.

It is therefore possible to connect an electrically powered pressure gauge directly to the copper ring (or star point) at the base of the motor. At the surface, the superimposed secondary voltage is applied either at the star point of a transformer or, if there is no transformer or its secondary delta is connected, a star point connection is added specifically for the purpose of superimposing the secondary voltage. Suitable filters and fuses are incorporated in these surface connections to protect against the star point becoming unbalanced, for example in the event of a fault on one of the three phases.

This arrangement can therefore be used to supply an impressed secondary power to the gauge. Power can be sent to the pressure gauge from surface, and an electrical signal can be transmitted by the gauge to the surface over the motor power cable, without affecting the operation of the motor, or conversely without the motor power affecting the gauge signal. Such an arrangement is known as a phantom circuit and is well known to those familiar with the art of ESPs and permanent gauges.

Figure 2:
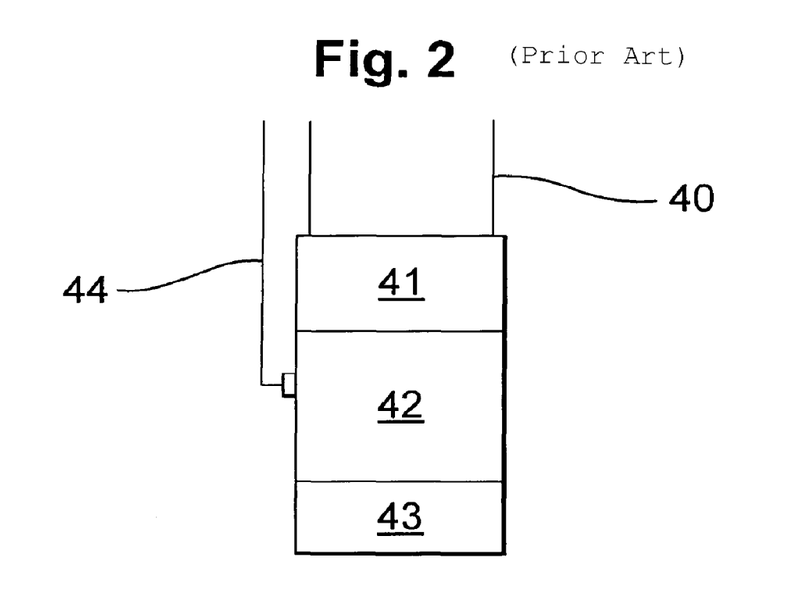
FIG. 2 is a schematic diagram of a conventional ESP arrangement.

A conventional ESP and gauge arrangement is shown in FIG. 2. Jointed tubing (40) supports the arrangement. The arrangement comprises a pump (41) connected to the jointed tubing, a motor (42) connected below the pump and a gauge (43) connected below the motor. A power cable (44) is coupled externally to the motor.

Permanent downhole gauge systems that utilise the motor's power cable to send information to the surface and to supply power to the gauge system are known as "comms on power" gauge systems and are well known in the art.

Recently, there has been interest in deploying pump and motor assemblies into wells using an electro-mechanical cable or coiled tubing rather than supporting the pump on jointed tubing. In such arrangements, it is desirable to connect the power cable directly to the top of the motor, with the pump in turn below the motor. This is the reverse of the conventional arrangement and introduces the problem that a "comms on power" gauge cannot be connected to the motor winding at the star point at the base of the motor unless some means of transmitting mechanical power from the motor to the pump is provided. Because the gauge would necessarily be located between the motor and the pump, a rotating shaft would have to pass through the gauge assembly to allow transmission of torque from the motor to the pump. However, no such arrangement currently exists.

Additionally, conventional motors, as described above, are provided with windings of n+½ turns to allow series connection of multiple motors. This arrangement requires the star point and gauge to be located at the bottom of the motor. Single motors with an integer number of winding turns are known and used where only that one motor is required. The windings in single motors are generally brought together and shorted at the same end of the motor as the cable connection, but this arrangement prevents the series connection of one or more motors to create a larger motor. This feature of series connection is very desirable because it allows a wide range of motor assemblies to be created by connecting together relatively few types of smaller motors, reducing the inventory required to satisfy a wide range of motor sizes.

There is a need, therefore, for a motor having a construction which avoids the above-mentioned shortcomings.

According to a first aspect of the present invention, a motor assembly comprises a motor unit having a first end and a second end and being couplable adjacent the first end of the motor unit to an external electrical device, the motor unit comprising at least one motor winding extending between the first and second ends and an electrical return path extending from the second end to the first end, the electrical return path being in electrical contact at the first end with an electrical connector for supplying impressed secondary power to the external electrical device, wherein the first end of the motor unit is provided with means for coupling a power source to the motor winding and the second end of the motor unit is provided with means to electrically couple the motor winding to the electrical return path.

The invention allows a "comms on power" electrical device, such as a gauge, to be used with a cable-deployed motor or a motor deployed on the end of coiled tubing and powered by a power cable extending through the coiled tubing. This is because the gauge can be positioned above the motor, allowing the motor to be coupled adjacent to and above the pump.

The arrangement according to the invention also advantageously permits several motors to be connected together in series, as discussed in more detail below. The impressed secondary power is a secondary voltage which is superimposed onto the main supply for powering the motor.

The motor unit may comprise three motor windings which each extend from the first end to the second end of the motor unit. In this way, the motor unit may include a three phase motor. Means for coupling the windings to a three phase power source can be provided at the first end of the motor unit.

Alternatively, the motor unit may comprise at least one single phase motor. In this case, the motor winding extending between the first and second ends of the motor unit is a first half of the single phase motor winding, the motor unit further including a second half of the single phase motor winding. The second half of the single phase motor winding has the same number of winding turns as the first half. Embodiments comprising single phase motors will be described in more detail below.

Generally, the motor winding can comprise an incomplete number of windings, for example n+½ turns (where n is a whole number). A whole turn is understood to be a full loop around the stator of the motor whereas a half turn is understood to be only half a loop. The electrical return path can comprise a conductor, such as an electrical wire.

Preferably, the motor unit includes an electrical return path for each of a plurality of motor windings. In this case, the motor unit may comprise means to separately couple each winding to a corresponding electrical return path. Providing separate electrical return paths for each motor winding means that each electrical return path has a section that conforms to the winding arrangement of the respective motor winding, forming half a turn thereof. In other words, the electrical return path has a length which effectively completes the final half turn of the winding, though the two halves of the final turn are not continuous. Since the combination of the winding and the return path results effectively in a complete number of turns, the motor has improved electrical and magnetic flux balance compared with conventional submersible motor assemblies which use an incomplete whole number of turns. The motor assembly of the present invention is therefore more efficient than some conventional submersible motors.

In one embodiment, each of the electrical return paths is in electric contact at the first end of the motor unit with the electrical connector for supplying power to the external electrical device. The electrical connector may simply comprise the ends of the conductors which form the electrical return paths, said ends being connected together or being connected to a conductor such as a copper ring, for example to form a star point.

Alternatively, several electrical connectors may be provided at the first end of the motor unit, each of the electrical return paths being in electric contact with one of the electrical connectors. In this case, the motor assembly may further comprise a coupling unit, such as a shorting ring, separably coupled to the first end of the motor unit. The coupling unit allows a "comms on power" device to be coupled thereto so as to draw off the superimposed current for powering the "comms on power" device. The coupling unit can comprise electrical connectors to electrically connect to the electrical connectors at the first end of the motor unit, the electrical connectors of the coupling unit each also being in electric contact with an electric conductor, such as a copper element, for example a copper ring, within the coupling unit. The coupling unit preferably comprises means for coupling the electric conductor of the coupling unit to the external electrical device.

Rather than providing an electrical return path for each of the motor windings, a single electrical return path may be provided. The means to couple the motor windings to the electrical return path can be adapted to electrically couple each motor winding to the return path. For example, the means may include a star point. Accordingly, where one or more three phase motors are provided, the three phases are balanced at the point where the electrical return path is coupled, so the electrical return path does not conform to the winding arrangement of the motor and does not contribute to the operation of the motor.

Although the means for coupling the motor winding(s) to the electrical return path(s) can be integral with the motor unit, the means are preferably separably coupled at the second end of the motor unit. In other words, the motor winding(s) and the electrical return paths are discontinuous. In this way, where the motor unit comprises two or more separate motors coupled together in series, as described below, the individual motors can be identical. There is no need for the final motor in the series to have a different design to the other motor(s) in the series, i.e. there is no need for the final motor to include the means for coupling the motor winding(s) to the electrical return path(s). This provides flexibility for constructing the motor assembly and reduces the number of different component parts which must be held in store.

Further, because the means for coupling the motor winding(s) to the electrical return path(s) are separable, the invention has the further advantage that it is backwards compatible with existing jointed tubing deployed systems. If a standard star joint is connected at the bottom end of the motor unit, rather than the means for coupling the motor winding(s) to the electrical return path(s) according to the present invention, a "comms on power" device such as a gauge can be connected underneath the motor assembly in a conventional manner. The electrical return path is then not used. Accordingly, the invention has the benefit that it can be used in situations where a motor and pump assembly is deployed on an electro-mechanical cable whilst also being easily extended to use in conventional situations involving jointed tube deployment.

Advantageously, the motor winding comprises two or more sub-windings electrically coupled in series. In this case, the electrical return path can comprise a plurality of sub-sections electrically coupled in series, there being one sub-section per sub-winding. Each sub-winding in the series and its respective sub-section of the electrical return path can form part of a motor. Accordingly, the motor unit can comprise a plurality of motors which are couplable so as to electrically couple the ends of adjacent sub-windings and sub-sections. This embodiment of the invention therefore provides a motor assembly that can not only be deployed by an electro-mechanical cable or coiled tubing and can allow the connection of an external "comms on power" device, but can also allow the combination of several motors in series in order to form one larger motor.

The motors can be identical, each comprising a sub-winding or several sub-windings and one or more sub-sections of the electrical return path. Electrical connectors on the motors allow the sub-winding(s) and electrical return path sub-section(s) to electrically connect in series to the sub-winding(s) and electrical return path sub-section(s) of adjacent motors.

The motor unit may comprise one or more induction motors or one or more permanent magnet motors. In either case, the stator windings can be the same.

According to a second aspect of the invention, a motor comprises a motor winding having a first end, and a second end and an incomplete number of winding turns between the first and second ends, and an electrical return path for passing a current through the motor, the motor winding and the electrical return path being discontinuous. The motor may have any of the features of the individual motors described above in connection with the first aspect of the invention (a motor winding of the second aspect corresponding to a sub-winding of the first aspect).

Further, a motor assembly may comprise a motor unit having a motor according to the second aspect of the invention or a plurality of such motors coupled in series, the motor unit having a first end and a second end, the unit further comprising means for electrically connecting the motor winding of the motor at the second end of the unit to the electrical return path of the respective motor, said means being separably coupled to the motor unit. The motor assembly may have any of the features of the motor assembly of the first aspect of the invention.

The invention will now be described, by way of example only, with reference to the accompanying drawings, in which.

Figure 3:
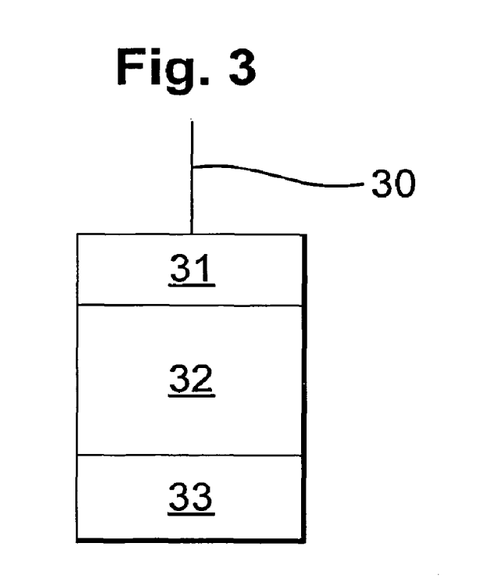
FIG. 3 is a schematic diagram of an ESP arrangement incorporating a motor assembly according to the present invention.

FIG. 3 shows an ESP arrangement suspended from an electro-mechanical cable (30). The assembly could instead be suspended from coiled tubing, an electrical cable for supplying power to the motor extending through the coiled tubing. The arrangement comprises an electrically powered pressure gauge (or other electrical device) (31), a motor assembly (32) in accordance with the present invention and a pump (33) which is located below the motor assembly. Mechanical power is transferred from the motor to the pump via the motor's rotor. Electrical power is transferred from the electrical cable to the motor assembly (32) via three electrical wires incorporated into and extending through the electrical device for that purpose.

Figure 4:
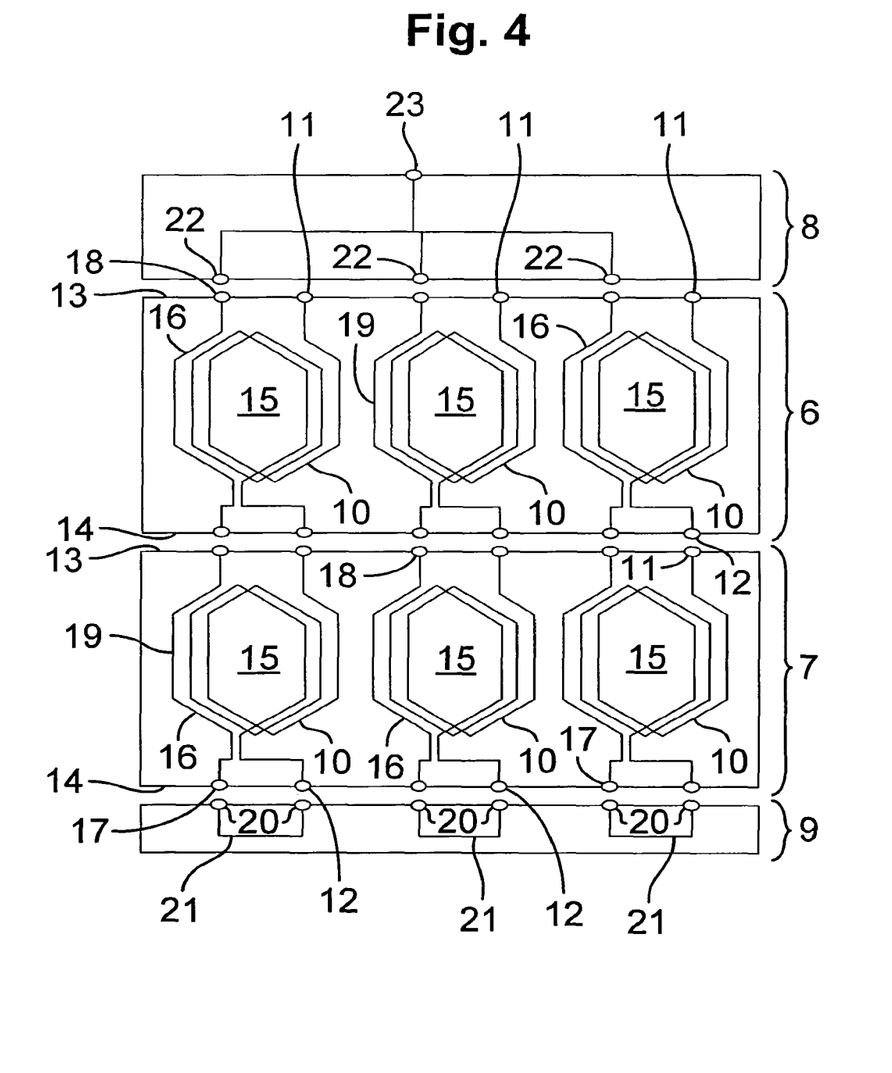
FIG. 4 is a schematic diagram of a first embodiment of the invention.

FIG. 4 shows a motor assembly having a motor unit comprising two motors (6,7) coupled together in series, a coupling unit (8) coupled to a first end of the motor unit and means (9) coupled at the second end of the motor unit for coupling motor windings of the motor unit to electrical return paths of the motor unit. An external electrical device (see FIG. 3), such as a downhole monitoring gauge system and particularly a "comms on power" downhole monitoring gauge system, can be coupled adjacent the first end of the motor assembly, to the coupling unit (8). In use, the motor assembly is deployed so that the first end is above the second end, allowing the external electrical device to be positioned above the motor assembly.

Each motor (6,7) is identical to the other. Accordingly, any number of motors can be connected in series to form a motor assembly of the required size.

Each motor (6,7) has three sub-windings (10) which connect in series to the corresponding sub-windings (10) of the adjacent motor to form three motor windings which extend between the first and second ends of the motor unit. The motors (6,7) are three phase motors. Each sub-winding (10) has a first electrical connector (11) at a first face (13) of the respective motor, a second electrical connector (12) at a second face (14) of the respective motor and an incomplete number of turns (15) between the two connectors (11,12), specifically n+½ turns, where n is a whole number. In fact, in this example there are 2.5 turns in each sub-winding (10), though in practise many more turns may be provided.

Each motor (6,7) further has three electrical return path sub-sections (16) which connect in series to the corresponding electrical return path sub-sections (16) of the adjacent motor to form an electrical return path which extends between the second and first ends of the motor unit. Each electrical return path sub-section has a first connector (17) at the second face (14) of the respective motor and a second connector (18) at the first face (13) of the respective motor, and a portion of conductor (19) which conforms to the winding arrangement of the turns (15) in the sub-windings, thereby forming the final half a winding turn.

Each motor (6,7) therefore has six connectors (11,18, 12,17) at each of the first (13) and second (14) faces. This arrangement of connectors for the sub-windings (10) and the electrical return path sub-sections (16) means that any number of identical motors (6,7) can be coupled together in series to form the motor unit. It can be seen that the first face (13) of one of the motors (6) forms the first end of the motor unit and the second face (14) of another of the motors (7) forms the second end of the motor unit. Consequently, the second connectors (18) of the electrical return path sub-section (16) of the upper-most motor (6) constitute the electrical connectors at the first end of the motor unit, which are used to supply power to the external electrical device. Further, the first connectors (11) of the sub-windings (10) of the upper-most motor (6) allow a three phase power source (not shown) to be coupled to the three windings to power the motor assembly. Three conductors transmitting the three phase power supply can simply pass through openings in the coupling unit (8). Alternatively, the power supplies may connect in a first plug/socket arrangement into the coupling unit (8), the coupling unit (8) then having a second plug/socket arrangement for connecting to the sub-windings (10) and there being electrical conductors between the first and second plug/socket arrangements (insulated from the coupling unit) to put the sub-windings (10) in electrical connection with the power supply.

Means (9) are provided at the second end of the motor unit to electrically couple the motor windings to the electrical return paths. The means (9) separately couple each motor winding to a corresponding electrical return path. In this example, this takes the form of a separate unit (9) which can be connected at the second end of the motor unit, i.e. it can be connected to the last motor (7) in the series. The unit (9) has three pairs of connectors (20), each connector being electrically coupled to the other connector in its pair by a conductor (21), such as an electrical wire.

In this way, when the motors (6,7) and the unit (9) are coupled together as shown in FIG. 4, there exists three electrical circuits, extending from the first connectors (11) of the first motor (6), i.e. the motor winding connectors at the first end of the motor unit, into the sub-windings (10), through the unit (9) attached at the second end of the motor unit and then back to the first end of the motor unit via the electrical return paths formed by the sub-sections (16) in each motor (6,7). As mentioned above, each motor sub-winding (10) includes 2.5 winding turns and each electrical return path sub-section (16) includes a portion (19) which conforms to the winding arrangement of the sub-winding (10). Although this portion (19) of the electrical return path sub-section (16) is discontinuous with the sub-winding (10), when connected as described through the unit (9), it becomes the final half a turn of the winding, which essentially completes an integer number of turns in the sub-winding. Accordingly, this arrangement provides a well-balanced motor which operates with improved efficiency compared with conventional motors of the type shown in FIG. 1.

The coupling unit (8), which in this embodiment is a star point, is connected at the first end of the motor unit. A star point simply includes an electrical conductor such as a copper ring, to which the three electrical phases can be connected. The use of a copper ring to connect the three phases to form the star point is well known in the art. The star point has three connectors (22) which connect to the second connectors (18) of the electrical return path sub-sections (16) of the first motor (6). A further connector (23) on the star point (8) allows a gauge or other electrical device to be coupled thereto. The gauge typically includes suitable electronics, such as diodes, which allow the gauge to operate off the impressed secondary voltage flowing through the motor assembly. Such electronics are well known in the art and are not the subject of the invention.

The various connectors referred to above are typically electrical pins/contacts, as widely used in the electrical and electronics industries.

Figure 5:
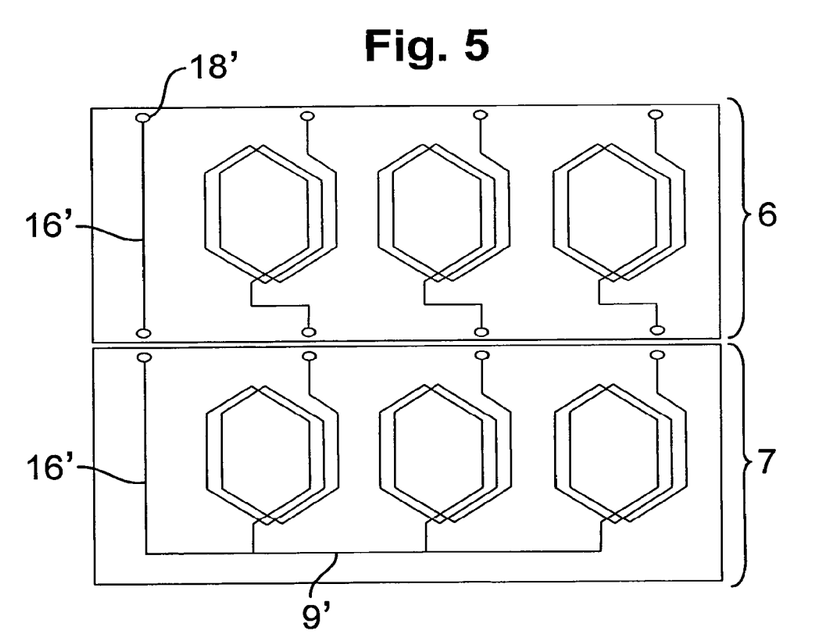
FIG. 5 is a schematic diagram of a second embodiment of the invention

Another embodiment of the invention is shown in FIG. 5. This embodiment is largely the same as the embodiment shown in FIG. 4, with a few exceptions. Firstly, the means (9') for coupling the motor windings to the electrical return path is formed integrally at the second end of the motor unit, rather than being provided as a separate unit (9) which connects to the last motor (7). Accordingly, the last motor (7) in the series (the second motor in this example) is slightly different to the other motors in the series since it has this integral section (9') to couple the motor windings to the electrical return path.

Further, the means (9') for coupling the motor windings to the electrical return path couples each of the motor windings together at the second end of the motor unit. A copper ring/star point can be provided for this purpose. Only one electrical return path is therefore provided, each motor comprising a single electrical return path sub-section (16'). Since the electrical return path is coupled after the point where the three phases are balanced, the electrical return path sub-sections (16') do not contribute to the operation of the motor and so do not conform to the sub-windings (10).

Finally, since the motor windings are combined at the second end of the motor unit and a single impressed secondary voltage-carrying wire i.e. a single electrical return path (16') is fed back to the first end of the motor unit, a separate star point at the top of the motor unit is not needed. Instead, the electrical return path is terminated at the first end of the motor unit (i.e. at the first face (13) of the first motor (6)) with an electrical connector (18') to which the gauge can be connected for powering said gauge.

Embodiments of the invention comprising single phase motors will now be described. There is a difference between the three phase motors described above and single phase motors. As mentioned above, the current flowing in the three phases of a three phase motor sum to zero, allowing the three phases to be connected either at the first end of the motor unit (as in FIG. 4) or at the second end of the motor unit (as in FIG. 5). When the three phases are connected, the individual phase currents flowing into and out of the star point sum to zero at the star point. Accordingly, all that is left at the star point when the three phases are connected is the additional impressed current for powering the "comms on power" device.

A single phase motor is balanced at the mid-point of the electrical winding. A "comms on power" device can therefore be powered via a connection at the mid-point of the electrical winding. The principle of the present invention can be extended to single phase motors by splitting the electrical winding of the single phase motor into a 'first half winding', which corresponds to the motor winding discussed above, and an additional 'second half winding', whereby the first and second half windings can be connected to form the full single phase electrical winding. It is where the two half windings are connected that the current for the "comms on power" device is drawn off.

Figure 6:
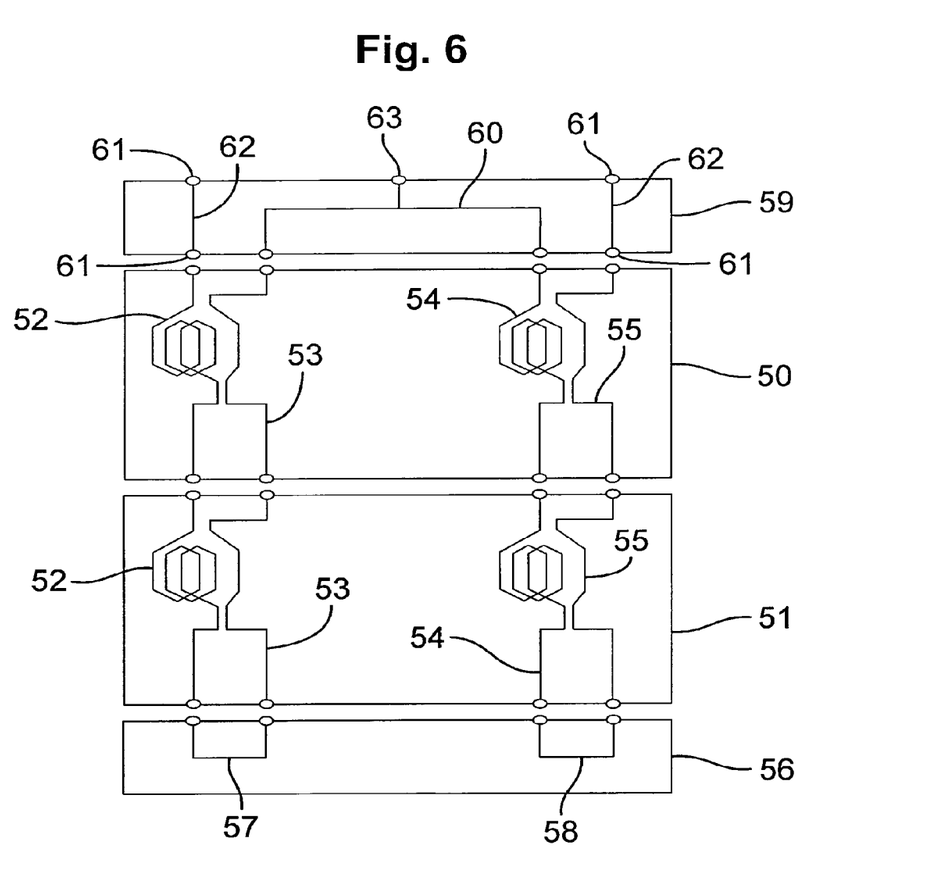
FIG. 6 is a schematic diagram of a third embodiment of the invention.

FIG. 6 shows a motor assembly comprising two single phase motors (50,51). Each single phase motor has a motor sub-winding (52) which will hereinafter be referred to as a first half sub-winding (52) and an electrical return path sub-section (53). Each single phase motor (50,51) further comprises a second half sub-winding (54) and a supply conductor sub-section (55). The first half sub-windings, electrical return path sub-sections, second half sub-windings and supply conductor sub-sections connect in series to sub-windings or sub-sections respectively in the adjacent motor. Thus, the series of first half sub-windings (52) together form the first half winding; the series of second half sub-windings (54) together form the second half winding; the series of electrical return path sub-sections (53) together form the electrical return path; and the series of supply conductor sub-sections (55) together form the supply conductor, each of which extends from the first end of the motor unit to the second end of the motor unit.

The assembly further comprises means for coupling the first half, winding to the electrical return path. The means can be a separate unit (56) similar to the unit (9) described in connection with FIG. 4. It can include a pair of connectors which are coupled by a conductor (57) such as an electrical wire. The means (56) includes a second conductor (58) for connecting the second half winding to the supply conductor.

Finally, the assembly comprises a coupling unit (59) to which a "comms on power" device can be coupled for drawing off the superimposed current via the connector (63). In this embodiment, the coupling unit (59) also electrically couples the electrical return path to the second half winding by way of a conductor (60). Accordingly, when the means (56) is connected at the second end of the motor unit, the electrical return path in combination with the conductor 60 allow the first and second half windings to be in electrical communication thereby forming a full winding for the single phase motor.

The coupling unit (59) further includes electrical connectors (61) and conductors (62) for enabling the single phase voltage to be applied to the first half winding directly and to the second half winding via the supply conductor.

It can be seen that this arrangement allows the efficient operation of a single phase motor assembly, whilst also permitting a "comms on power" device to be powered via the impressed current. Several motors may be used in combination in the motor unit, or only one motor may be used. The "comms on power" device, such as a gauge, can be located at the top of the arrangement (i.e. at the first end of the assembly).

This embodiment of the invention shares the above-mentioned benefit of backwards compatibility. More specifically, the assembly can be easily extended to conventional jointed tubing deployed systems in which the gauge is located at the bottom of the motor unit. In this scenario, a single phase voltage is applied to the first ends of the first and second half windings and the second ends of the half windings are connected together via an electrical conductor at the second end of the motor unit. The gauge is coupled beneath the motors, to the electrical conductor, to draw off its current.

Figure 7:
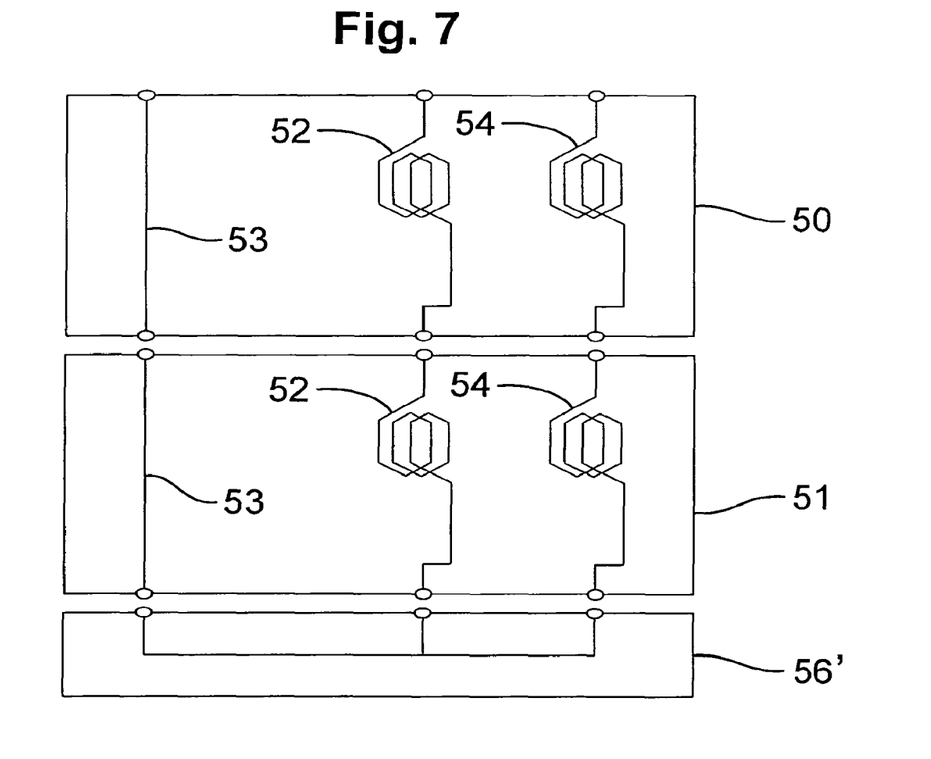
FIG. 7 is a schematic diagram of a fourth embodiment of the invention.

A further single phase motor assembly is shown in FIG. 7. In this embodiment, the single phase voltage is applied directly to the second half winding (54) rather than via the supply conductor (55), which is absent in this embodiment. The means (56') for coupling the first half winding (52) to the electrical return path (53) also connects the first half winding (52) to the second half winding (54). Accordingly, the electrical return path (53) can be coupled directly to the "comms on power" device.

Alternatives and modifications within the scope of the invention will be apparent to the skilled reader. For example the star point (8) described in connection with FIG. 4 could be made to be integral with the first motor (6), in which case the first motor (6) would have a slightly different construction to the other motors (7) in the series. Additionally, the lowest motor (7) in FIG. 5 may be identical to the upper motor (6), in which case means, such as a copper ring, can be separably connected at the second end of the motor unit to electrically couple the motor windings to the electrical return path. Also, other numbers of motors can be connected in series and other numbers of motor windings/electrical return paths can be provided.

The invention claimed is:

1. A motor assembly comprising a motor unit having a first end and a second end and being couplable adjacent the first end of the motor unit to an external electrical device, the motor unit comprising at least one motor winding extending between the first and second ends and an electrical return path extending from the second end to the first end, the electrical return path being in electrical contact at the first end with an electrical connector for supplying impressed secondary power to the external electrical device, wherein the first end of the motor unit is provided with means for coupling a power source to the motor winding and the second end of the motor unit is provided with means to electrically couple the motor winding to the electrical return path.

2. An assembly according to claim 1, in which three motor windings are provided which each extend from the first end to the second end of the motor unit.

3. An assembly according to claim 2, in which the motor unit includes an electrical return path for each of the motor windings, each motor winding being electrically coupled to a respective one of the electrical return paths by the means to couple the motor winding to the electrical return path.

4. An assembly according to claim 3, in which each electrical return path is in electrical contact at the first end of the motor unit with a separate electrical connector for supplying power to the external electrical device.

5. An assembly according to claim 4, further comprising a coupling unit separately coupled to the first end of the motor unit, the coupling unit connecting to said electrical connectors at the first end of the motor unit for combining the current in the electrical return paths, the coupling unit further comprises means for electrically coupling to the external electrical device to power said device.

6. An assembly as claimed in claim 1, in which the motor unit comprises at least one single phase motor.

7. An assembly according to claim 1, in which the means for coupling the motor winding(s) to the electrical return path(s) are separately coupled at the second end of the motor unit such that the motor winding(s) and the electrical return path(s) are discontinuous.

8. An assembly according to claim 1, in which the or each motor winding comprises a plurality of sub-windings electrically coupled in series and the or each electrical return path comprises a corresponding number of sub-sections electrically coupled in series, each sub-winding in the series and its respective electrical return path sub-section forming part of a motor.

9. An assembly according to claim 1, in which the motor winding comprises an incomplete number of winding turns, such as n+½ turns, where n is a whole number.

10. An assembly according to claim 1, in which the electrical return path includes a section that conforms to the winding arrangement of the motor winding, forming half a turn thereof.

11. A motor comprising a motor winding having a first end and a second end and an incomplete number of winding turns between the first and second ends, and an electrical return path for passing a current through the motor, the motor winding and the electrical return path being discontinuous.

12. A motor as claimed in claim 11, comprising three motor windings.

13. A motor as claimed in claim 12, comprising three electrical return paths.

* * * * *